Patented Jan. 30, 1951

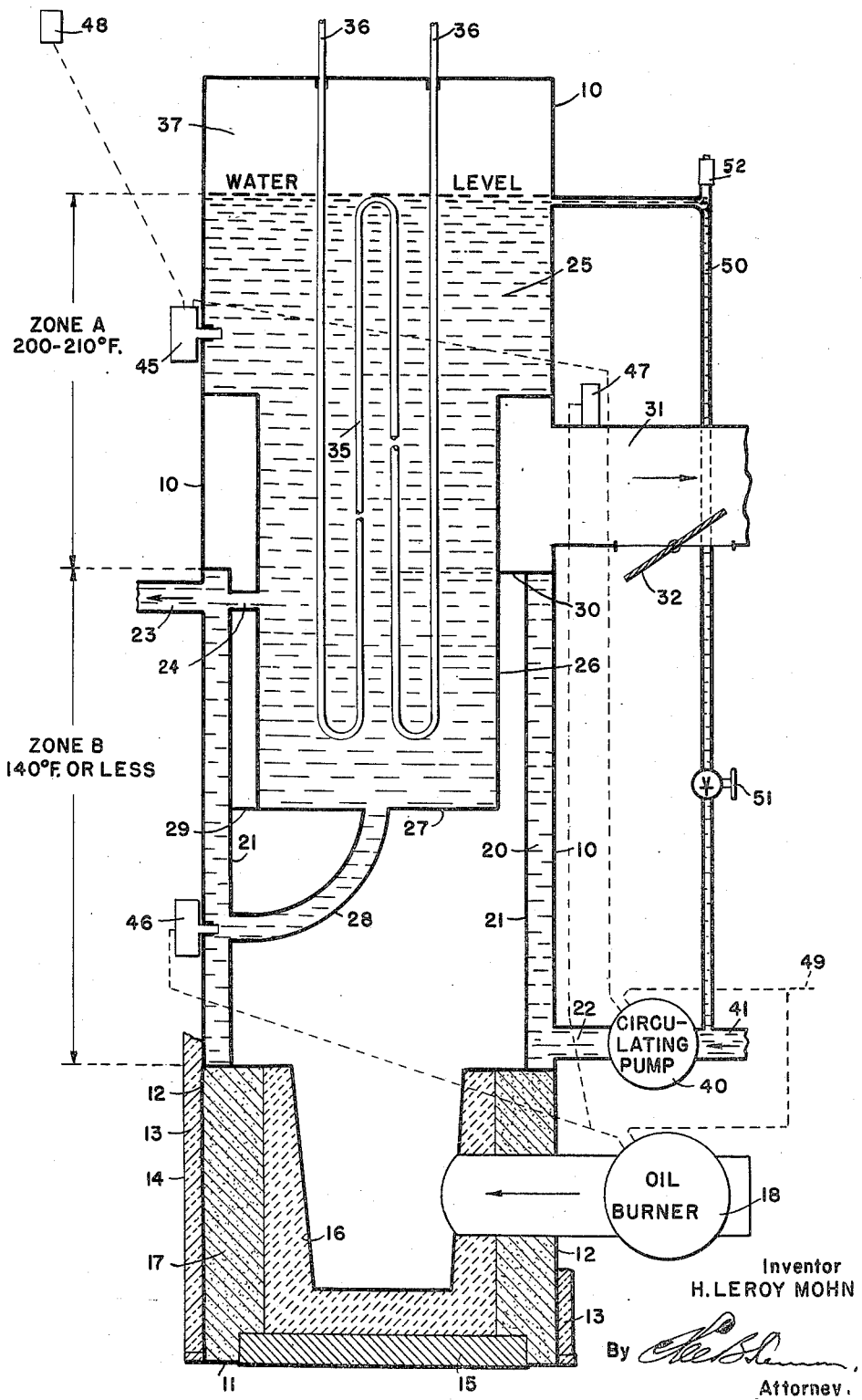

2,540,055

UNITED STATES PATENT OFFICE 2,540,055

HEATING SYSTEM

Henry Leroy Mohn, York, Pa., assignor to York-Shipley, Inc., York, Pa., a corporation of Delaware Application August 17, 1948, Serial No. 44,690

4 Claims. (Cl. 122—156)

This invention relates to heating systems and more particularly to an improved water heating unit and the controls associated therewith.

In heating systems for residential use, it is common to provide a domestic hot water heating coil within the heating unit. The domestic water coil is often placed in the hot water chamber of the heater, or it is sometimes placed directly in the combustion zone of the heater. Such domestic water coils are usually connected to a domestic hot water storage tank separate from the heater. It is generally desired that the temperature of boiler water for heating domestic hot water be of the order of 200° F. On the other hand, residence heating requirements may usually be met with circulated hot water at temperatures of 140° F. or less. Where heating water and domestic hot water are heated in a single heating unit, it is difficult to maintain ample supplies of both domestic and heating water at the desired temperature difference.

It is an object of this invention to provide a water heating unit adapted to supply heating water at one temperature and to supply ample domestic hot water at a higher temperature.

It is another object of this invention to provide a heating unit for heating and domestic hot water which does not require a separate storage tank for the domestic hot water.

It is another object of this invention to provide a heating unit having simple controls adapted to maintain supplies of hot water therein at substantially different temperatures.

It is another object of this invention to provide a heating unit with controls which give priority to the heating of domestic hot water whenever the demand for domestic hot water is relatively great.

It is a further object of this invention to provide a heating unit for continuous summer and winter use to provide heating water at a desired temperature when needed, and to provide for heating domestic hot water to a higher temperature than the heating water temperature at all times.

It is a still further object of this invention to provide a simple and economical automatic heating system which does not require the use of separate storage tanks or auxiliary heating devices.

Other objects and advantages of this invention will be readily apparent from the following description and the accompanying drawings illustrating a preferred embodiment of the invention.

The drawing is a diagrammatic elevational view, partly in section, of a heating unit and the automatic controls used therewith.

Referring to the drawing, the heating unit includes a tubular upright casing designated by the numeral 10, the casing 10 being supported above a base plate 11 by an annular member 12. The casing 10 may be formed of sheet steel and may comprise a number of annular sections suitably joined together by welding. A conventional insulating jacket 13 and outer casing 14 may surround the entire casing 10 and the member 12, as is well known in the art, only a small portion of the jacket and casing being shown in the drawing. Within the member 12, a high temperature cement base 15 is provided on the base plate 11, and a replaceable ceramic combustion chamber 16 is supported on base 15. Vermiculite fill 17 may be provided between the chamber 16 and the member 12. A conventional oil burner 18, preferably of the gun type, is supported from the member 12 with its burner tube directed into the combustion chamber 16.

An annular water chamber 20 formed by the casing 10 and an inner annular member 21 extends upward from the top of combustion chamber 16 as shown. The chamber 20 is closed at its lower and upper ends and is provided with an inlet connection 22 at or near the bottom, and with an outlet connection 23 at or near the top of the chamber. A second water chamber 25 is formed by the upper portion of casing 10 and a tubular portion 26 extending downward within the upper portion of chamber 20. An upper circulator tubular connection 24 is provided between the upper portion of chamber 20 and the portion 26 of the upper chamber 25. The bottom closure 27 of chamber 26 is provided with a circulation tube 28 connecting the space within chamber 26 to the water chamber 20. A semi-annular baffle ring 29 is provided in the space between chamber 20 and the lower portion of chamber 26, and a second semi-annular baffle ring 30 extends between the upper portion of chamber 20 and the central chamber 26. The baffle rings 29 and 30 are arranged with respect to each other so that hot gas combustion products from combustion chamber 16 are directed laterally around the tubular chamber 26 before reaching the outlet flue 31. A conventional automatic draft regulator 32 is provided in the flue connection 31.

A coil 35 is provided in the upper water chamber 25 for heating domestic hot water. The coil 35 may include a number of loops of continuous tubing having suitable inlet and outlet connections 36 external to the top of the casing 10. A restricting orifice may be placed in the inlet connection to control the rate of flow of water through the coil 35. The top of the casing 10 is closed to provide a closed air space 37 above the normal level of water in the chamber 25. The air space 37 serves as an expansion chamber for expansion of the water contained in the heating unit and permits use of the heating unit in a closed heating system without any external expansion tank or overflow outlet. A pressure relief safety valve may be provided if required.

The heating unit inlet connection 22 is provided with a circulating pump 40, a hot water return 41 from conventional heat radiators, not shown, being connected to the pump inlet. The outlet connection 23 is connected to the heat radiators in a conventional manner.

The preferred controls to be used with the heating unit described above include a thermostatic switch 45 secured to casing 10 and extending into water chamber 25, a thermostatic switch 46 secured to casing 10 and extending into water chamber 20 adjacent the lower end of circulation tube 28, a protecting thermostatic switch 47 secured to the draft flue 31, and a conventional room or house thermostat 48 in the space to be heated. The room thermostat 48 and the switch 45 are connected in series with a power supply 49 to a motor which drives the circulating pump 40. The switch 46 and the protecting switch 47 are connected in series with the power supply to the burner 18. The burner 18 may have conventional electric ignition circuits which are well known in the burner art. Switch 45 is set to open the pump circuit when the temperature of the water in chamber 25 drops below about 185° F., and to close the circuit when the temperature exceeds about 195° F. The switch 46 is set to close the burner operating circuit when the temperature of the water in chamber 20 adjacent the tube 28 drops below about 170° F., and to open the circuit when the temperature exceeds about 180° F. The protecting switch 47 may be set to open the burner operating circuit when the temperature of the combustion products in draft flue 31 exceeds the maximum permissible stack temperature. All of the temperature settings mentioned above are approximate and the ranges may be varied depending on nature of the heating system with which the heater is connected and depending on the desired domestic hot water temperature.

A bleed line 50 is connected to the chamber 25 just below the normal water level therein and extends to the circulating pump inlet connection 41 through an adjustable throttle valve 51. A conventional air vent 52 may be provided in bleed line 50. This line is used to prevent overheating of the upper portion of the heater unit during long periods of heating when there has been no consumption of domestic hot water. The throttle valve 51 may be adjusted to limit the temperature of water in chamber 25 to about 210° F., so that the bleed line 50 conveys a relatively small amount of hot water out of the top of the heating unit into the bottom of lower chamber 20.

The normal operation of the heating unit and control system will now be described. With the switches and controls set as mentioned, water will be maintained in zone A, the upper portion of chamber 25, at temperatures of the order of 200°–210° F., and water will be maintained in zone B, chamber 20, at temperatures of the order of 140° F. or less. When the room thermostat 48 calls for heat, it closes the power circuit to operate pump 40 provided the temperature of the water in chamber 25 is high enough to close the circuit through switch 45. When the demand for room heat is satisfied, the thermostat 48 opens the power circuit to stop operation of the circulating pump 40. When domestic hot water is drawn from the heating coil 35 submerged in hot water in chamber 25, the temperature of the water in chamber 25 will begin to drop. When the temperature in chamber 25 drops below about 185° F., then switch 45 will open the power circuit to pump 40 to stop further circulation of room heating water. The pump 40 cannot resume operation until the temperature in chamber 25 has been brought back up to about 195° F. Since the demand for domestic hot water is usually for short periods only, the flow of heat to the building is interrupted only temporarily without any serious effects. When domestic hot water is drawn, chilled water in chamber 25 passes downward through the circulator tube 28 causing switch 46 to close the power circuit to operate the burner 18. The time lag between the withdrawal of domestic hot water and the starting of the burner 18 is only one or two minutes because the circulator tube 28 directs the chilled water directly to the switch 46. When the domestic hot water demand is turned off, the burner 18 continues to operate until the temperature of the water in chamber 20 adjacent switch 46 rises above about 180° F. At the time of burner shut off by switch 46, the temperature of the water in chamber 25 will be back up to about 200° F. If the temperature of water in the upper portion of chamber 25 rises to about 210° F. then hot water flows through the bleed line 50 and throttle valve 51 to the inlet of pump 40 and into the lower chamber 20 preventing excess temperatures in the upper chamber 25. As described above, the control system gives priority to the heating of domestic hot water and temporarily interrupts the circulation of building heating water until the water in chamber 25 for heating domestic hot water is up to a definite minimum temperature. The wiring circuit has been indicated only diagrammatically in the drawing and it is to be understood that conventional details of low voltage thermostat and/or switches operating through suitable relays may be provided without departing from the spirit of this invention.

The above-described heating unit and control system has been found to perform with high efficiency and makes possible the use of a tankless coil in a relatively small heater. The system is suited for application to radiant heating systems where water of relatively low temperatures is circulated to heating coils and is likewise suited for use with radiator type heating where higher temperatures may be utilized. The flexibility of the control system provides for furnishing an ample supply of domestic hot water at desired high temperatures and for furnishing building heating water at somewhat lower temperatures.

It will be apparent that many changes in minor details, proportions, and design may be carried out within the scope of this invention as defined in the following claims.

What I claim is:

1. A system for heating and circulating water for space heaters and for heating water for domestic use in which a domestic hot water coil is immersed in heated water, comprising in combination, a water chamber for containing space heating water, a second water chamber extending above said first water chamber for containing water for heating domestic hot water, a conduit connecting said first chamber with the lower portion of said second chamber, a burner for heating the water in both said chambers, a circulator connected to said first chamber for circulating heated water from said first chamber to a space to be heated and back into said first chamber, and control means in said second chamber connected to said circulator for controlling the actuation of said circulator.

2. A system for heating and circulating water for space heaters and for heating water for domestic use in which a domestic hot water coil is immersed in heated water, comprising in combination, an annular water chamber for containing space heating water, a drum-shape water chamber within and extending above the upper end of said annular chamber, a conduit connecting the annular chamber with the lower portion of said drum-shape chamber, a burner for heating water in both of said chambers, a circulator connected to said annular chamber for circulating heated water from said annular chamber to a space to be heated and back into said annular chamber, and control means in said drum-shape chamber connected to said circulator for controlling the actuation of said circulator.

3. A system for heating and circulating water for space heaters and for heating water for domestic use in which a domestic hot water coil is immersed in heated water, comprising in combination, a water chamber for containing space heating water, a second water chamber extending above said first water chamber for containing heated water for heating domestic hot water, a conduit connecting said first chamber with said second chamber, a burner for heating water in both said chambers, a circulator connected to said first chamber for circulating heated water from said first chamber to a space to be heated and back into said first chamber, and a thermostatic switch responsive to the temperature of water in said second chamber and connected to said circulator for controlling the actuation of said circulator.

4. A system for heating and circulating water for space heaters and for heating water for domestic use in which a domestic hot water coil is immersed in heated water, comprising in combination, an annular water chamber for containing space heating water, a closed drum-shape water chamber within and extending above the upper end of said annular chamber for containing water and air, a conduit connecting said annular chamber with the lower portion of said drum-shape chamber, a burner for heating the water in both said chambers, a circulator connected to said annular chamber for circulating water from said annular chamber to a space to be heated and back into the lower portion of said annular chamber, a second conduit connecting the upper portion of said drum-shape chamber with the lower portion of said annular chamber, and control means responsive to the temperature of the water in said drum-shape chamber connected to said circulator for limiting operation of said circulator.

H. LEROY MOHN.

REFERENCES CITED

The following references are of record in the file of this patent:

UNITED STATES PATENTS

| Number | Name | Date |
|---|---|---|
| 1,384,995 | Fries et al. | July 19, 1921 |
| 1,957,741 | Toreky | May 8, 1934 |
| 1,980,424 | Morgan | Nov. 13, 1934 |
| 2,151,108 | Hultgren | Mar. 21, 1939 |
| 2,312,622 | Brantly | Mar. 2, 1943 |

FOREIGN PATENTS

| Number | Country | Date |
|---|---|---|
| 69,418 | Sweden | July 19, 1928 |